United States Patent [19]

Varreng

[11] Patent Number: 4,855,536
[45] Date of Patent: Aug. 8, 1989

[54] POWER CABLE HAVING SECTIONALIZED SCREEN AND METHOD OF MAKING SAME

[75] Inventor: Jan Varreng, Oslo, Norway

[73] Assignee: Alcatel STK A/S, Oslo, Norway

[21] Appl. No.: 256,773

[22] Filed: Oct. 11, 1988

[30] Foreign Application Priority Data

Oct. 13, 1987 [NO] Norway ............................. 874258

[51] Int. Cl.⁴ ........................................... H02G 15/08
[52] U.S. Cl. ..................................... 174/73.1; 156/49; 174/85
[58] Field of Search .................... 174/73.1, 85; 156/49

[56] References Cited

U.S. PATENT DOCUMENTS

| | | | |
|---|---|---|---|
| 3,800,064 | 3/1974 | Lusk | 174/73.1 |
| 4,283,595 | 8/1981 | Anosov et al. | 174/73.1 |
| 4,357,487 | 11/1982 | Goehlich et al. | 174/73.1 |
| 4,454,375 | 6/1984 | Takaoka et al. | 174/73.1 |
| 4,479,031 | 10/1984 | Ishise et al. | 174/73.1 |

FOREIGN PATENT DOCUMENTS 2040112  8/1980  United Kingdom ............... 174/73.1

OTHER PUBLICATIONS

Dam-Andersen, M. et al., "Design, Manufactuing and Installation of XLPE-Cables in Denmark", CIGRE Report 21-08, 1986, 5 pages.

Primary Examiner—Laramie E. Askin
Attorney, Agent, or Firm—Christie, Parker & Hale

[57] ABSTRACT

The invention relates to interruption of screens of power cables (1,2) with double stress cone systems (23,30). Such interruption systems have hitherto always been made at the same place as the cable core joints. However, with interruption systems at the location of the cable core joint, undesirable gas pockets can form at the interface between the joint insulation and the double stress cone system. In order to eliminate this problem, the interruption system is provided at a position remote from the cable core joint.

7 Claims, 1 Drawing Sheet

POWER CABLE HAVING SECTIONALIZED SCREEN AND METHOD OF MAKING SAME

TECHNICAL FIELD

The present invention relates to a method for installation of high voltage power cables and in particular to a method for sectionalizing the outer screens on single core cables.

This application is based on and claims priority from an application first filed in Norway on Oct. 13, 1987 under Ser. No. 87 4258. To the extent that such prior application may contain additional information that might be of any assistance in the use and understanding of the invention claimed herein, it is hereby incorporated by reference.

BACKGROUND ART

The currents or electromotive forces which are included in the sheaths and screens of the three single core cables making up a three-phase cable installation can be untolerably high, but they can be eliminated by dividing the screens into isolated sections and crossbonding them. So far, the screen interruptions have always been made at the same site as the cable joints. The screens are crossbonded at the interruption sites and the screens are usually grounded for every third cable section.

In Cigre report No. 21-08 of 1986 there is described design, manufacturing and installation of XLPE cables in Denmark. ("XLPE" stands for "crosslinked polyethylene".) In connection with sectionalizing joints, there are described three different principles for interruption of the screens in such cables. Of the three different systems, 1 (a double stress cone system), 2 (a screen overlap system), and 3 (a high resistivity system), the first one is in our opinion the best alternative. As mentioned in said article, special care must be taken to ensure that the metallic connections from the stress cone to the metal sheath of the cable and to the bonding leads do not mechanically influence the position of the stress cone. It is also mentioned that allowance has to be made for the methane gas from the vulcanized joint insulation to escape without forming air pockets in the interface between the XLPE insulation and the stress cone.

SUMMARY OF INVENTION

The object of the present invention is to provide a sectionalizing and crossbonding system which makes use of a double stress cone system, but which does not involve the risk of forming gas pockets in the interface between the applied XLPE insulation and the stress cone.

By displacing the screen interruption from the conductor joint and from the area where the XLPE insulation material is re-applied, a cable installation which satisfies the requirements has been obtained. The defined screen interruption may not only be used on XLPE cables, but it may also be used on oil-filled cables and mass-impregnated cables.

As the screen interruption takes place outside the jointing area of the cable core, crossbonding of the sheaths without jointing of the main cables is another option which is readily offered by the described method. When it will be possible to make longer cables sections, the described method will allow sectionalizing and crossbonding of the screens independent of the cable section joints.

BRIEF DESCRIPTION OF THE DRAWING

Above-mentioned and other features and objects of the present invention will clearly appear from the following detailed description of embodiments of the invention taken in conjunction with the drawings, where.

BEST MODE FOR CARRYING OUT THE INVENTION

Figure 1:
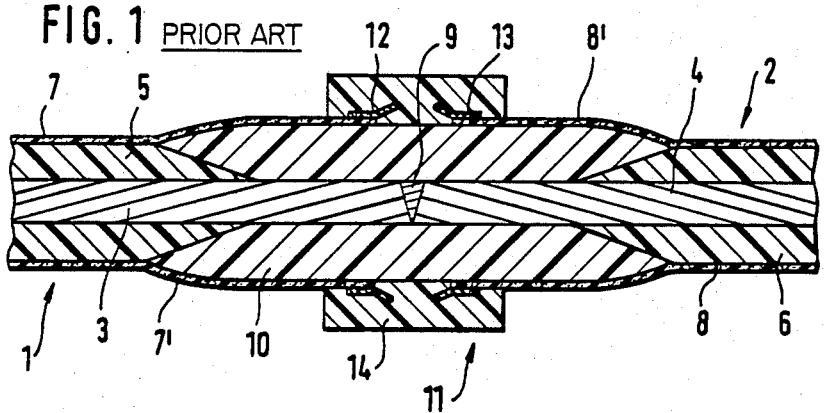
FIG. 1 shows a double stress cone screen interruption similar to that described in the mentioned Cigre report.

In FIG. 1 is illustrated a joint between two XLPE cables 1 and 2, each having a conductor 3 and 4 and a layer or layers of XLPE insulation 5 and 6 as well as outer conductive or semiconductive screens 7 and 8. The conductors 3 and 4 are jointed at 9 and the XLPE insulation is re-applied at 10. The two screens 7' and 8' are re-applied from the surface of the cables 1 and 2 over the re-applied XLPE insulation material 10 to meet in double stress cone 11. The double stress cone 11 has two electrodes 12 and 13 which are molded into a piece of insulation material 14. The re-applied XLPE insulation material may be crosslinked or vulcanized prior to or after application of the re-applied screens 7' and 8'. After the vulcanizing process, methane gas will escape from the insulation material. This may, as mentioned, quite often result in gas pockets at the interface between the re-applied XLPE insulation and the double stress cone.

Figure 2:
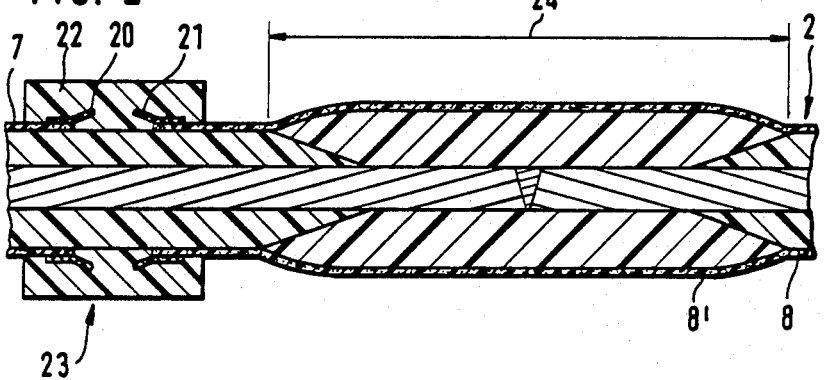
FIG. 2 shows our screen interruption system used in connection with a sectionalized cable core joint.

In FIG. 2 the two cables 1 and 2 each having insulated conductors with outer screens are jointed in nearly the same manner as described in connection with FIG. 1. However, the semiconducting or conducting screen 7 of cable 1 is terminated outside the conductor joint, whereas the re-applied semiconductor screen 8' from the cable 2 is completed over the conductor joint area 24 and terminated in the same area as the screen of the cable 1. The two screens 7 and 8' are terminated in contact with electrodes 20 and 21 which together with a molded piece of insulation material 22 makes a double stress cone 23. When the re-applied insulation material 10 of an XLPE joint is to be vulcanized or crosslinked, the methane gas is free to escape from the joint along the whole surface of the joint.

It would be clear that this double stress cone system may be used also for other types of cables such as oil-filled cables and mass-impregnated power cables. For XLPE cables the double stress cone may be made of an elastomeric material, whereas, for example, epoxy may be used for paper insulated oil filled cables.

Figure 3:
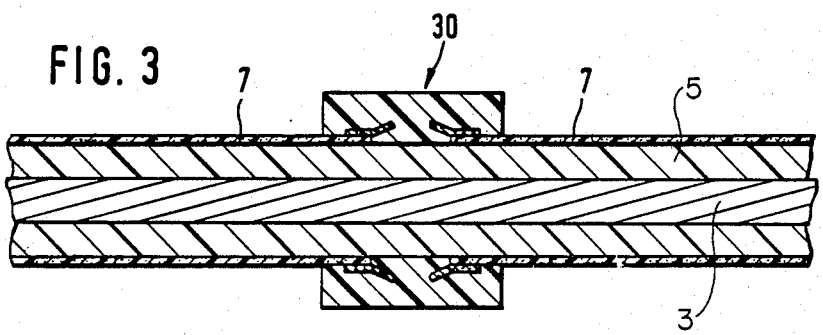
FIG. 3 shows our screen interruption system used on a non-jointed cable core.

When the outer semiconductor screen is to be terminated for crossbonding near a joint of the cable core as illustrated in FIG. 2, the molded stress cone ring 23 is placed over cable 1 before jointing of the cable core. If the sectionalizing and crossbonding of the screen is to be made distant from a cable core joint, the molded stress cone ring will have to be flexible (including the electrodes), so that it can be expanded to a larger diameter than the cable. In the expanded condition to about 1.4 times of the cable diameter it may be placed on a sleeve which can be pulled over the cable, or the cable may be pulled through the sleeve at the position where the crossbonding is to take place. In FIG. 3 is illustrated a double stress cone 30 placed on a cable surface distant from cable core joints. The screen 7 of the cable 1 (or the screen 8 of the cable 2) is interrupted at a place required and the two screen ends are terminated in the double stress cone 30. The crossbonding itself is not shown.

The above detailed description of embodiments of this invention must be taken as examples only and should not be considered as limitations on the scope of protection.

I claim:

1. A power cable comprising:
    at least one cable section having a splice-free portion having a substantially constant cross section defining a predetermined outer diameter and comprising a continuous conductor separated from a semiconductive screen by an insulative layer, and
    screen interrupting means dividing the semiconductive screen of said splice-free portion into crossbonded, electrically isolated sections, said screen interrupting means comprising a screen interruption area between two adjacent said electrically isolated sections and a double stress cone system above and extending to either side of said screen interruption area, said double stress cone system having a predetermined inner diameter substantially equal to said predetermined outer diameter.

2. The power cable of claim 1, wherein said splice-free portion of said cable section is divided into at least three said crossbonded, electrically isolated sections by at least two said screen interrupting means.

3. The power cable of claim 1 wherein said double stress cone system comprises a ring-shaped piece of flexible material in which are embedded two opposing cone-shaped electrodes each having an exposed inwardly facing electrode surface making electrical contact with a respective one of the two screen parts.

4. A method for fabrication a power cable comprising the steps:
    splicing the cable conductor of a first cable section composed of a cable conductor separated from a preexisting semiconductive screen material by a preexisting insulating material to the cable conductor of a second cable section composed of a cable conductor separated from a preexisting semiconductive screen material by a preexisting insulating material to form a joint area,
    covering the joint area with new insulating material extending to the preexisting insulating material at either side of the joint area,
    covering the new insulating material with new semiconductive screen material extending to the preexisting semiconductive screen material at either side of the joint area,
    removing a band of the preexisting semiconductive screen material to form a screen interruption area separating two adjacent screen portions at a location longitudinally displaced from the joint area and also longitudinally displaced from the new insulating material and the new semiconductive screen material, and
    locating a double stress cone system extending to either side of the screen interruption area, said double stress cone system comprising two cone-shaped electrodes molded in a piece of insulation material, each of the electrodes being respectively in electrical contact with a respective screen portion.

5. The method of claim 4, wherein the screen interruption area is formed prior to the formation of the joint area.

6. The method of claim 5, wherein the double stess cone system is placed over the screen interruption area prior to the formation of the joint area.

7. The method of claim 6, wherein the double stress cone system is formed of flexible materials and can be expanded to an inner diameter larger than that of the cable sections, and wherein the double stress cone system is temporarily held in such an expanded condition to facilitate placing the double stress cone system at the screen interruption area.

* * * * *

UNITED STATES PATENT AND TRADEMARK OFFICE
CERTIFICATE OF CORRECTION

PATENT NO. :   4,855,536
DATED      :   August 8, 1989
INVENTOR(S) :  Jan Varreng It is certified that error appears in the above-identified patent and that said Letters Patent is hereby corrected as shown below:

Column 1, lines 20,21, change "included" to -- induced --.
Column 1, line 67, change "cables" to -- cable --.

In the Claims

Column 3, line 39, change "fabrication" to -- fabricating --.

Signed and Sealed this

Thirteenth Day of November, 1990

Attest:

HARRY F. MANBECK, JR.

*Attesting Officer*    *Commissioner of Patents and Trademarks*